(12) United States Patent
Kwon et al.

(10) Patent No.: US 6,873,771 B2
(45) Date of Patent: Mar. 29, 2005

(54) HOLDER AND HOLDER BASE HAVING A WEDGE

(75) Inventors: Oh-Dal Kwon, Suwon-shi (KR); Sang-Wook Yoo, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 10/337,117

(22) Filed: Jan. 6, 2003

(65) Prior Publication Data

US 2003/0142916 A1 Jul. 31, 2003

(30) Foreign Application Priority Data

Jan. 26, 2002 (KR) .............................. 10-2002-0004642

(51) Int. Cl.⁷ .............................. G02B 6/00; G02B 7/00; G02B 6/36
(52) U.S. Cl. .......................... 385/52; 385/137; 269/287
(58) Field of Search .......................... 385/52, 134–137; 269/287; 29/281.5

(56) References Cited

U.S. PATENT DOCUMENTS

| | | | |
|---|---|---|---|
| 4,809,420 A | * 3/1989 | Landy et al. | 29/523 |
| 4,867,428 A | 9/1989 | Fricker | 269/134 |
| 4,901,991 A | 2/1990 | Bonkowski | 269/234 |
| 6,320,706 B1 | 11/2001 | Richard et al. | 359/822 |
| 6,606,444 B2 | * 8/2003 | Harman et al. | 385/137 |

FOREIGN PATENT DOCUMENTS

| | | | |
|---|---|---|---|
| DE | 4003846 | 5/1992 | G02B/6/24 |
| JP | 58-2799 | 8/1983 | G21G/4/06 |
| JP | 63-124437 | 5/1988 | H01L/21/66 |
| JP | 63-296013 | 12/1988 | G02B/7/00 |
| JP | 02-089423 | 3/1990 | H03M/1/12 |
| JP | 02-092951 | 4/1990 | C08L/29/14 |
| JP | 04-131810 | 5/1992 | G02B/6/42 |
| JP | 05-000324 | 1/1993 | B21D/1/06 |
| JP | 08-005871 | 1/1996 | G02B/6/42 |

* cited by examiner

*Primary Examiner*—Akm Enayet Ullah
*Assistant Examiner*—Omar Rojas
(74) *Attorney, Agent, or Firm*—Cha & Reiter, LLC (57) ABSTRACT

Disclosed are a holder and a holder base used for mounting an optical object. The holder fixes an object by making contact with both sides of the object and includes a body having a protruding jaw formed at an upper portion thereof, and a protrusion part extending from the protruding jaw by a predetermined distance, wherein a hole is formed at the front portion of the protrusion part. A sliding member is coupled to the protrusion part through an opening formed at a center thereof and a spring is fixed to one end of the body and the other end of the sliding member, wherein the spring serves to provide an elastic restoring force to the sliding member in a direction towards the body. Further, a fixing nail is inserted into the hole of the protrusion part and is formed at one end thereof with a handle, and a wedge is coupled to the fixing nail through an opening formed at a sidewall thereof and inserted between the protrusion part and an inner wall forming the opening of the sliding member.

17 Claims, 10 Drawing Sheets

HOLDER AND HOLDER BASE HAVING A WEDGE

CLAIM OF PRIORITY

This application claims priority to an application entitled "HOLDER AND HOLDER BASE USING WEDGE", filed in the Korean Industrial Property Office on Jan. 26, 2002 and assigned Serial No. 2002-4642, the contents of which are hereby incorporated by reference.

BACKGROUND OF THE INVENTION

1. Field of the Invention

The present invention relates to a holder and a holder base having a wedge and, more particularly to a holder and a holder base capable of fixing an optical object by closely making contact with both sides of the object.

2. Description of the Related Art

An optical fiber block includes a block having a plurality of V-grooves at an upper surface thereof for mounting an optical fiber array and a glass lid for covering the optical fiber array coated with epoxy. The main function of optical fiber block is to connect an optical fiber ribbon to an input terminal or an output terminal of a planar waveguide device.

A waveguide device includes a waveguide for providing a traveling route for a light and a clad surrounding the waveguide, such that the light only passes through the waveguide. In particular, the waveguide device comprises a photo-semiconductor having a light waveguide, a clad stacked on a semiconductor substrate, and an optical fiber having a circular light waveguide and a clad surrounding the light waveguide.

The above described optical fiber blocks or planar waveguide devices have a high brittleness so it can be broken easily during the alignment process, in which a precise fixation is required. That is, an optical object can be easily broken if an excessive amount of fixing force is applied thereto. At the same time, if the fixing force is not adequate, the object can not be securely fixed.

Figure 1:
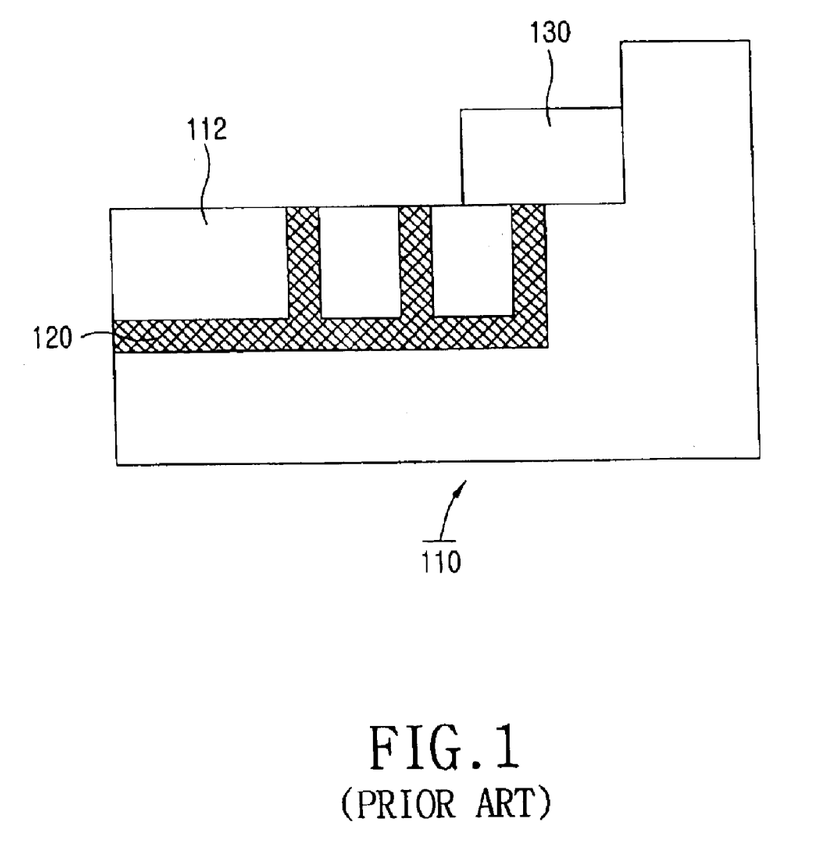
FIG. 1 is a view showing a conventional aligning method for an optical fiber block using a vacuum chuck mechanism.

FIG. 1 is a view showing a conventional method for aligning an optical fiber block 130 using a vacuum chuck mechanism 110. As shown in FIG. 1, a pipe 120 connected to a vacuum pump (not shown) is buried in the vacuum chuck 110. The output terminals of the pipe 120 are exposed to an upper surface 112 of the vacuum chuck 110. Accordingly, when the vacuum pump is operated, the optical fiber block 130 is fixed to the upper surface 112 of the vacuum chuck 110.

However, above-mentioned aligning method tend to cause a vibration due to uneven vacuum pressure, so the alignment of the fiber block 130 cannot be maintained securely. In addition, it is difficult to secure an object to the upper surface 112 of the vacuum chuck 110 if the lower surface of the object making contact with the upper surface 112 of the vacuum chuck 110 is uneven.

Figure 2:
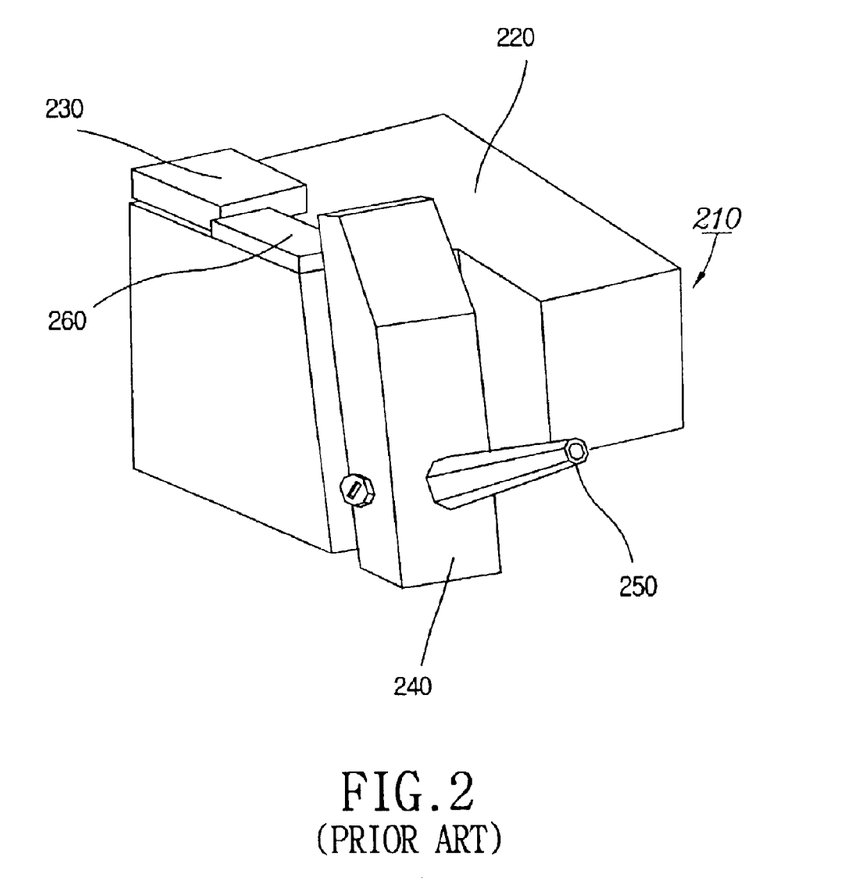
FIG. 2 is a view showing a conventional aligning method for an optical fiber block using a fastening chuck mechanism.

FIG. 2 is a view showing another conventional aligning method for an optical fiber block 260 using a fastening chuck mechanism 210. As shown in FIG. 2, the fastening chuck 210 includes a body 220, a protrusion 230, a pressing part 240, and a screw 250. The optical fiber block 260 is aligned between the pressing part 240 and the protrusion 230. In this state, the optical fiber block 260 is fixed using the force provided by the screw 250 on the pressing part 240. However, this aligning method requires a fine adjustment of the screw 250 during operation as the optical fiber block 260 can be broken easily if too much pressure is applied by the screw 250.

Figure 3:
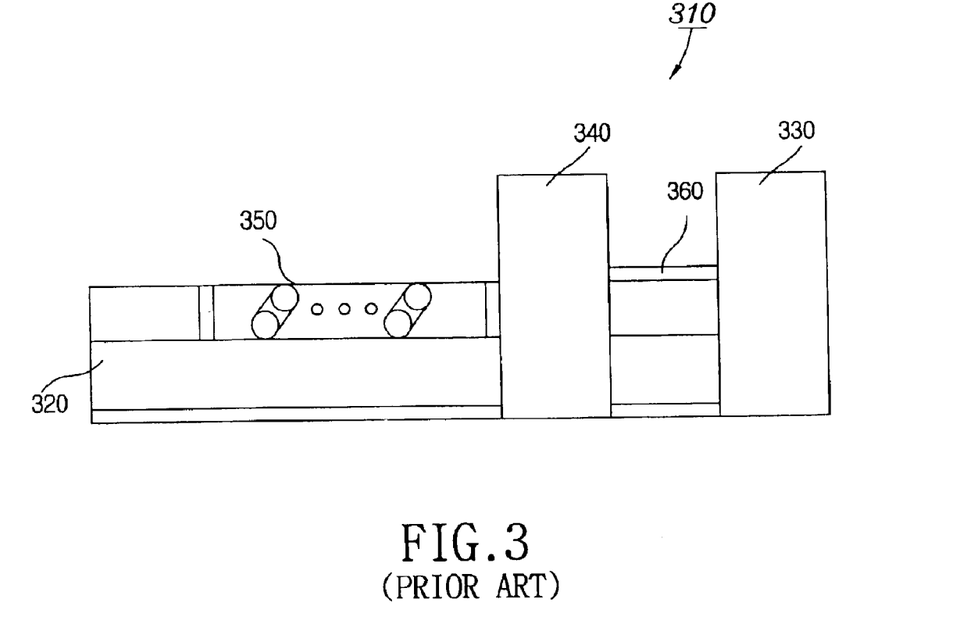
FIG. 3 is a view showing a conventional aligning method for an optical fiber block using a pressing chuck mechanism.

FIG. 3 is a view showing another conventional aligning method for an optical fiber block 360 using a pressing chuck mechanism. As shown in FIG. 3, the pressing chuck 310 includes a base 320, a supporting part 330, a pressing part 340, and a spring 350. The optical fiber block 360 is aligned between the supporting part 330 and the pressing part 340. This aligning method uses an elastic restoring force of the spring 350. However, the force applied to an object to be fixed vary depending on the weight of the object, thus the fixed object can be unsteady according to the forced applied to the object.

As described above, the conventional aligning methods have drawbacks. Therefore, when carrying out an automatic aligning operation using the conventional method, an additional component, such as a positioning apparatus or a position detecting sensor, is required to prevent the object from colliding with other components during the alignment process.

SUMMARY OF THE INVENTION

Accordingly, the present invention has been made to solve the above-mentioned problems occurring in the prior arts and provides additional advantages, by providing a holder and a holder base capable of detachably mounting an object on a predetermined position in a simple manner, without disturbing the object being fixed, and capable of performing an automatic alignment without requiring additional equipment, such as a sensor.

According to one aspect of the invention, there is provided a holder for fixing an object by making a contact with both sides of the object, the holder comprising: a body including a protruding jaw formed at an upper portion thereof, and a protrusion part extending from the protruding jaw by a predetermined distance and having a hole at a front portion thereof; a sliding member coupled to the protrusion part through an opening formed at a center thereof; a spring having a first end fixed to the body and a second end fixed to the sliding member, the spring applying an elastic restoring force to the sliding member in a direction towards the body; a fixing nail having a handle inserted into the hole of the protrusion part and formed at one end thereof; and, a wedge coupled to the fixing nail through an opening formed at a sidewall thereof, and inserted between the protrusion part and an inner wall forming the opening of the sliding member According to another aspect of the invention, there is provided a holder base for mounting a holder used to fix an object by making contact with both sides of the object, the holder base comprising: a housing including a main groove on an upper surface thereof and an auxiliary groove bent extending from a first end of the main groove, a second end of the main groove being opposite to the first end of the main groove and connected to a hole formed at a side wall of the housing; and, a fixing nail including a connection part inserted into the hole, a handle connected to a first end of the connection part, and a wedge connected to a second end of the connection part, which is opposite to the first end of the connection part.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. For the purposes of clarity and simplicity, a detailed description of known functions and configurations incorporated herein will be omitted as it may make the subject matter of the present invention rather unclear.

Figure 4:
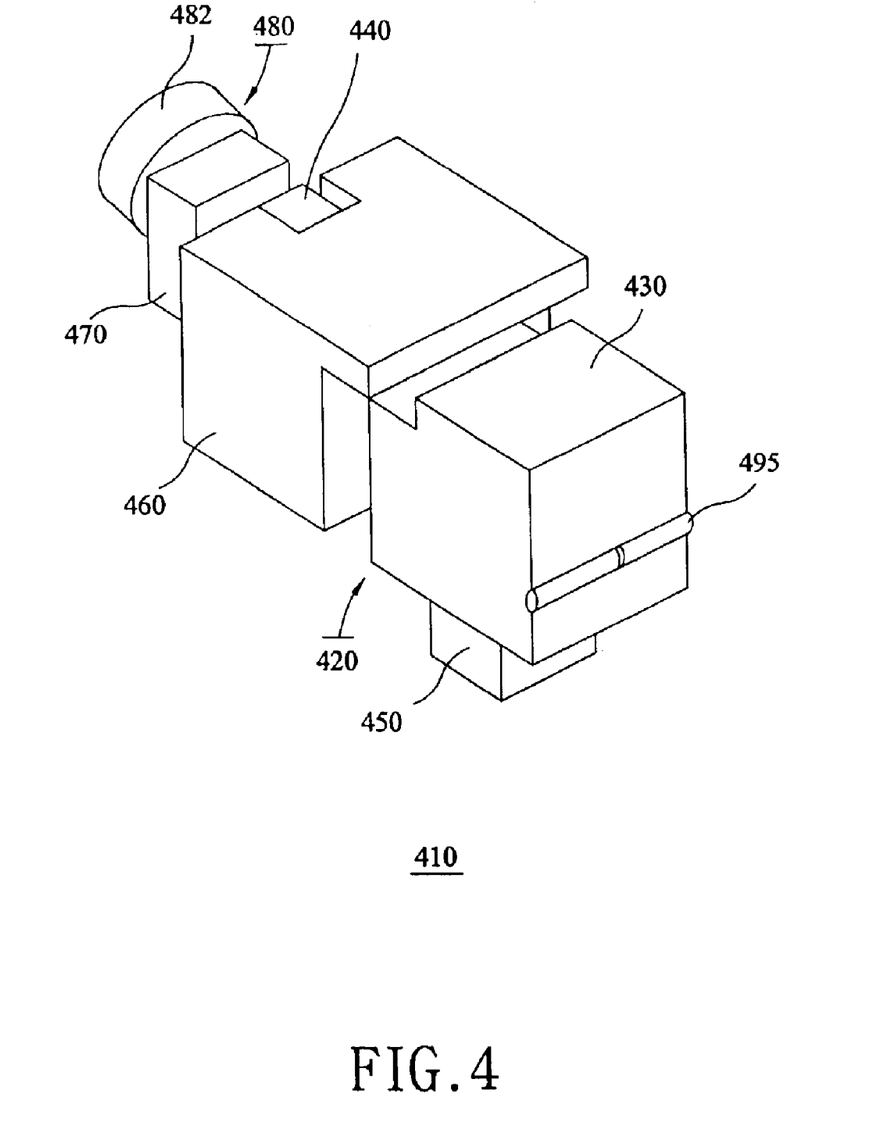
FIG. 4 is a perspective view showing a structure of a holder having a wedge according to one embodiment of the present invention.
Figure 5:
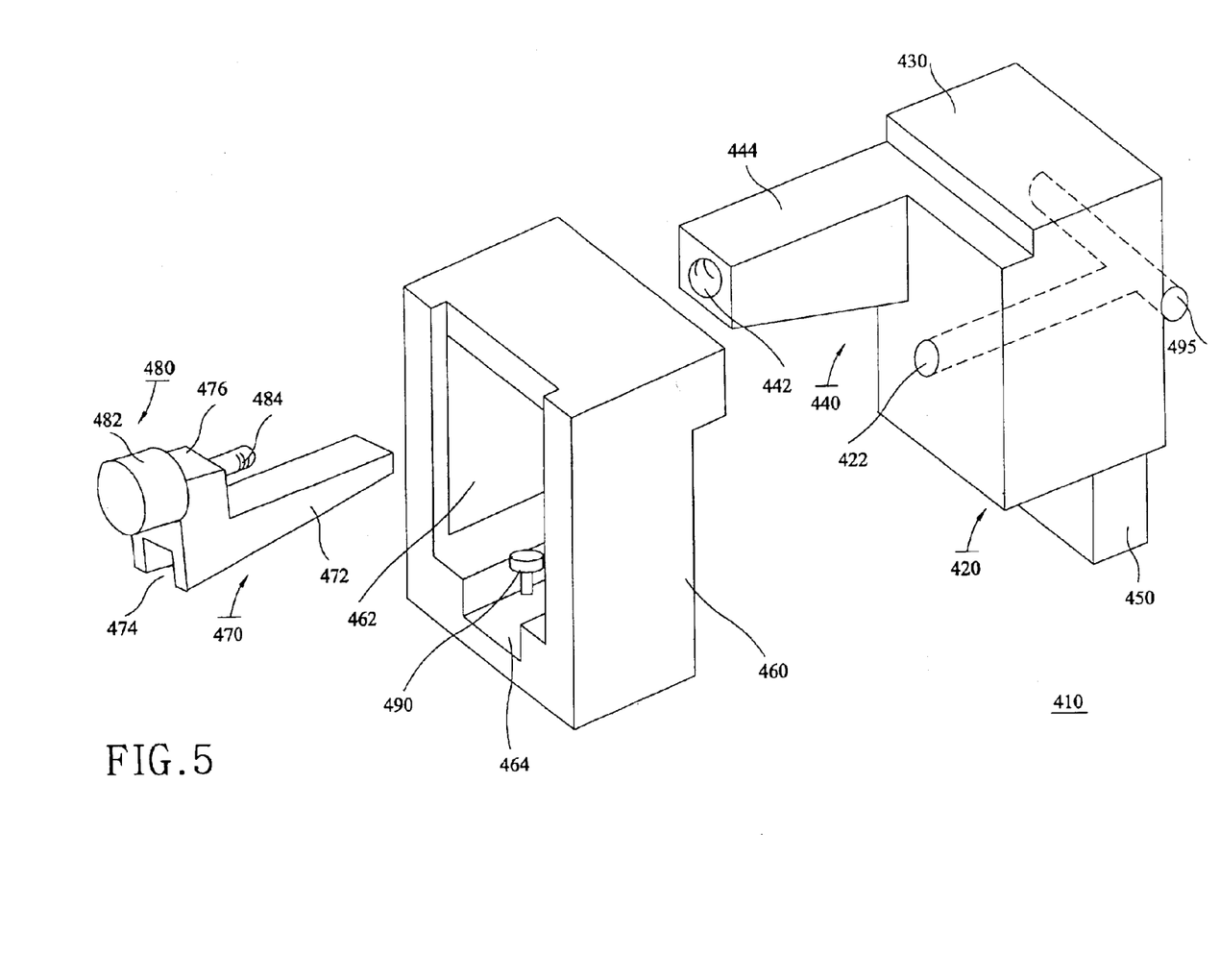
FIG. 5 is an exploded perspective view of a holder shown in FIG. 4.

FIG. 4 is a perspective view showing the structure of a holder having a wedge according to one embodiment of the present invention, and FIG. 5 is an exploded perspective view of the holder shown in FIG. 4. Note that, in FIG. 5, a spring element is omitted in order to make clear the subject matter of the present invention.

With reference to FIGS. 4 and 5, the holder 410 includes a body 420, a sliding member 460, a spring 500 (shown in FIG. 6), hangers 490 and 495, a wedge 470, and a fixing nail 480. The body 420 includes a protruding jaw 430, a protrusion part 440, and a supporter 450. An elongated cylindrical hole 422 is provided in the body 420. The protruding jaw 430 is positioned at an upper portion of the body 420. The upper surface and the side surface of the protruding jaw 430 have a rectangular shape. The protrusion part 440 extends from the protruding jaw 430 by a predetermined distance, and a hole 442 is formed at a front portion thereof. A spiral furrow is provided in a cylindrical wall of the hole 442.

The supporter 450 is positioned at a lower portion of the body 420. The lower part of the supporter 450 has a trapezoid shape, in which two interior angles are formed in a right angle, one interior angle is formed in an obtuse angle, and the remaining angles are formed in an acute angle.

The sliding member 460 has a rectangular frame shape having an opening at a center thereof. A rectangular groove 464 is formed at a lower wall of the sliding member 460. In addition, a first hanger 490 for suspending the spring 500 is disposed in the rectangular groove 464. The sliding member 460 is locked with the protrusion part 440 of the body 420 by passing through the opening 462. That is, the upper inner wall of the sliding member 460 makes a close contact with the upper surface 444 of the protrusion part 440, such that the sliding member 460 can slide on the upper surface 444 of the protrusion part 440.

Figure 6:
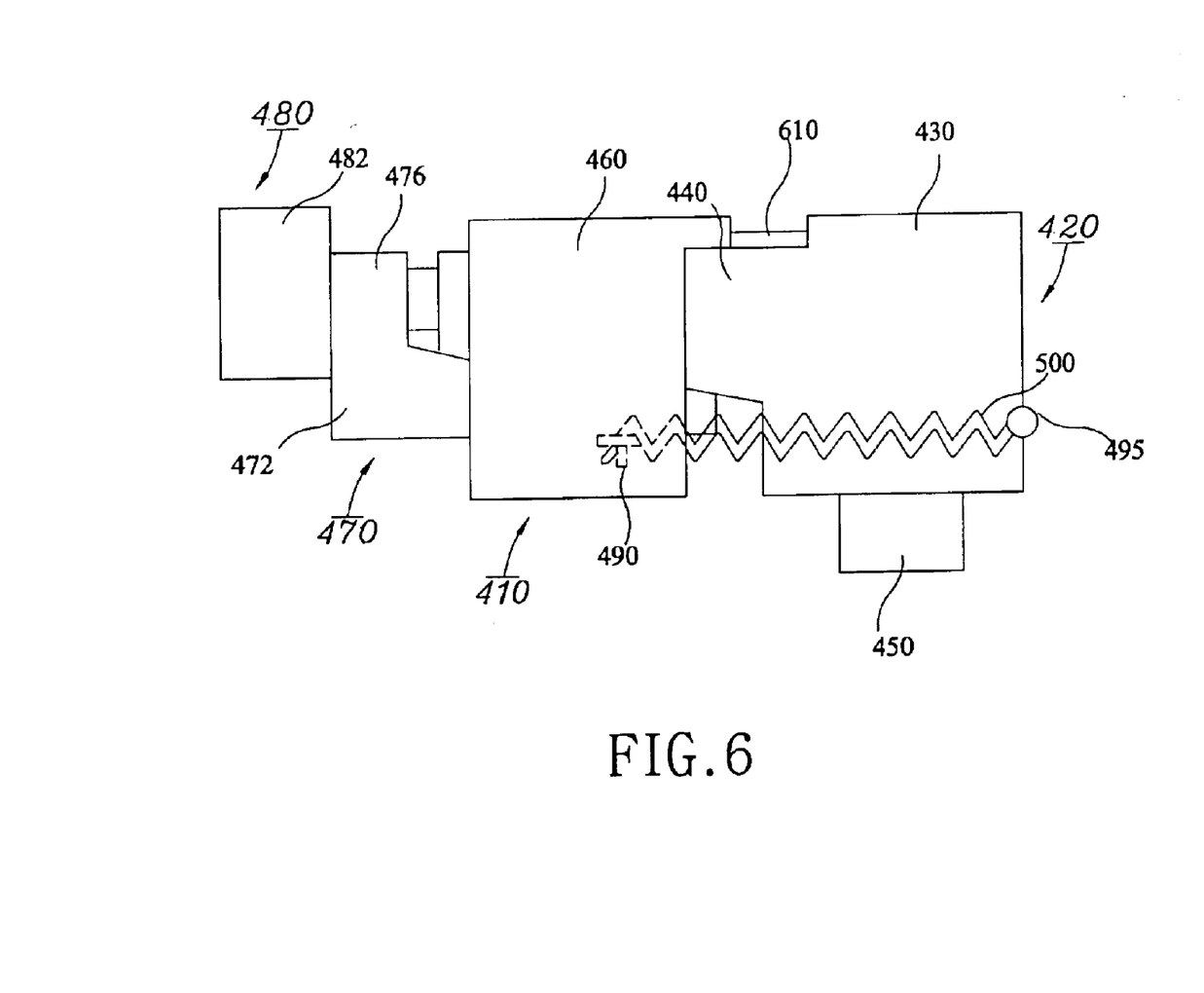
FIG. 6 is a side view showing an optical fiber block mounted on a holder having a wedge shown in FIG. 4.

The spring 500 provides an elastic restoring force to the sliding member 460 depending on a distance between the sliding member 460 and the body 420. One end of the spring 500 is fixed to the first hanger 490 of the sliding member 460, and the other end of the spring 500 is fixed to a second hanger 495 through the hold 422 formed in the body 420. The second hanger 495 has a cylindrical rod shape and the outer peripheral portion thereof is surrounded by the other end of the spring 500.

One end of the fixing nail 480 forms a disc-shaped handle 482, and the other end of the fixing nail 480 forms a female screw 484. The fixing nail 480 is fixedly inserted into the hole 442 of the protrusion part 440 via the opening of the sliding member 460.

The wedge 470 has a L-shape and a rectangular groove 474 is formed at a lower portion of the wedge 470. The wedge 470 includes a tapered base part 472 and a side wall 474 upwardly extending from one end of the tapered base part 472. In addition, a rectangular hole (not shown) is formed at the side wall 476, so that the wedge 470 can move in a direction vertical to the sliding direction of the sliding member 460. The fixing nail 480 is inserted into the hole 442 of the protrusion part 440 via the hole formed in the wedge 470.

Due to the pushing force of the fixing nail 480 applied to the wedge 470, the wedge 470 is inserted between the protrusion part 440 and a lower inner wall forming the opening 462 of the sliding member 460. At this time, a forward force of the wedge 470 acts against the sliding member 460 in a direction vertical to the sliding direction of the sliding member 460, so the sliding member 460 can be securely fixed. That is, the forward force of the wedge 470 is not applied in the sliding direction of the sliding member 460, so the forward force of the wedge 470 is not applied to the object interposed between the sliding member 460 and the protruding jaw 430. Accordingly, the fixing force with respect to the sliding member 460 is maximized, while preventing the object from being disturbed.

Referring to FIG. 6, the process for mounting the optical fiber block 610 on the holder 410 is as follows.

Initially, the holder 410 is inserted into a fixing hole (not shown) formed in an aligning apparatus (not shown) using the supporter 450. Then, the rotation of the fixing nail 480 forces the holder 410 to be held together through the hole 442 of the protrusion part 440.

Thereafter, the optical block 610 is interposed between the sliding member 460 and the protruding jaw 430. Then, in a state where both sides of the optical block 610 closely make a contact with sliding member 460 and the protruding jaw 430, the wedge 470 is press-fitted into the sliding member 460. That is, the wedge 470 is press-fitted between the protruding jaw 430 and the lower inner wall forming the opening 462 of the sliding member by rotating the fixing nail 470, so that the sliding member 460 is securely fixed.

With continued reference to FIG. 6, the process for detaching the optical fiber block 610 from the holder 410 is as follows.

Firstly, a margin space is provided between the handle 482 of the fixing nail 480 and the side wall 476 of the wedge 470 by rotating the fixing nail 480 in a reverse direction. Then, an operator detaches the optical fiber block 610 from the holder 410 while pulling the wedge 470 towards the handle 482 of the fixing nail 480.

Figure 7:
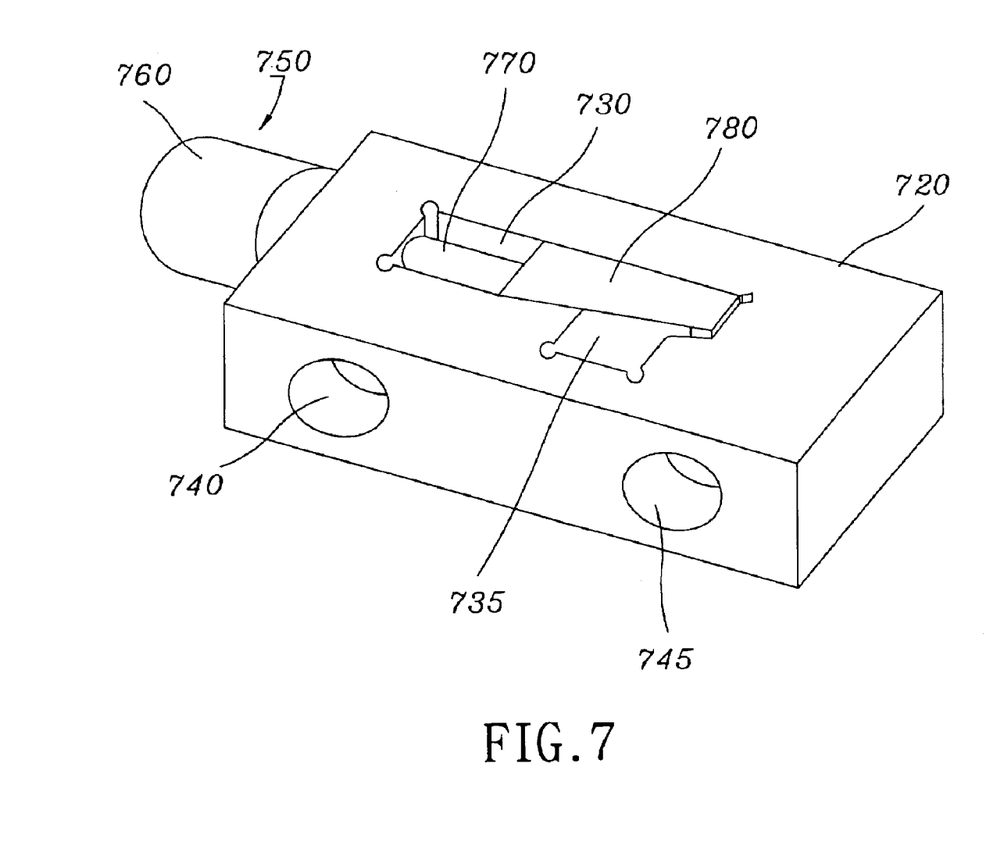
FIG. 7 is a perspective view showing a structure of a holder base for mounting a holder shown in FIG. 4 in accordance with one embodiment of the present invention.
Figure 8:
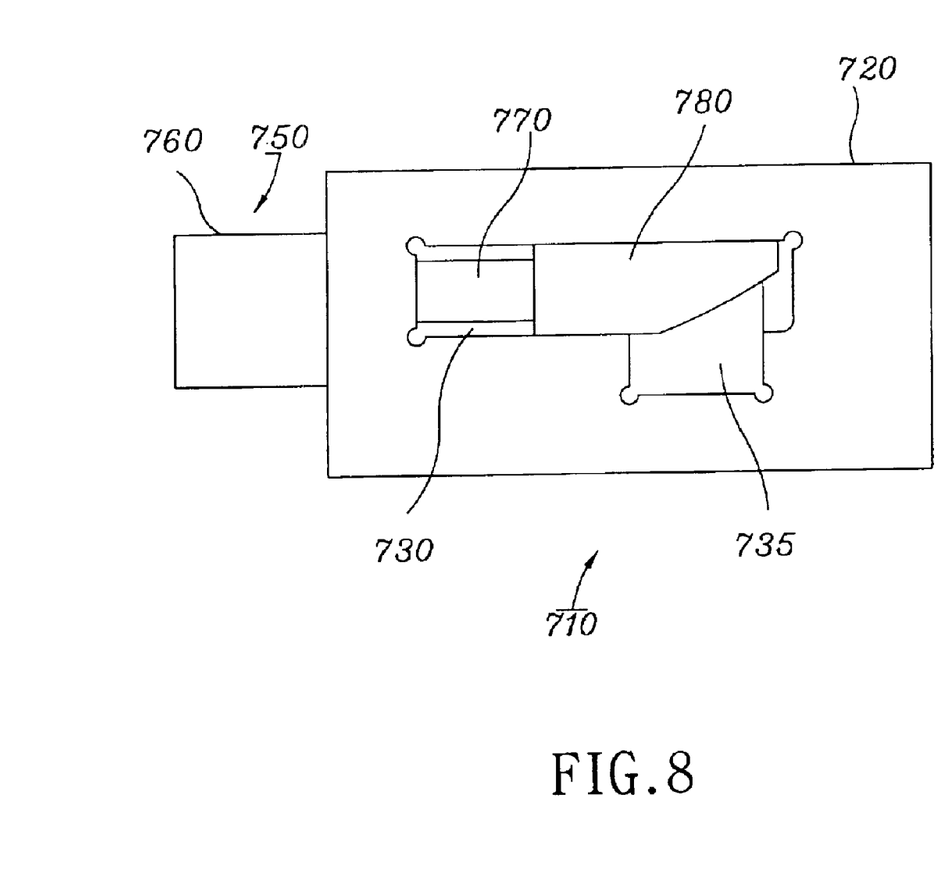
FIG. 8 is a front view of a holder base shown in FIG. 7.

FIG. 7 is a perspective view showing the structure of a holder base for mounting the holder 410 shown in FIG. 4, and FIG. 8 is a frontal view of the holder base shown in FIG. 7 according to one embodiment of the present invention.

The holder base 710 includes a housing 720 and a fixing nail 750. The housing 720 includes a main groove 730 having a box shape with an upper surface thereof being opened, and an auxiliary groove 735, which is bent from one end of the main groove 730. The auxiliary groove 735 has a shape similar to the shape of the supporter 450, such that the supporter 450 of the holder 410 can be inserted into the auxiliary groove 735. In order to easily receive the supporter 450 of the holder 410, edges of the auxiliary groove 735 are chamfered into a C-shape.

The other end of the main groove 730 is connected to a first circular hole formed at one side wall of the housing 720. In addition, second and third circular holes 740 and 745 are formed at the other side wall of the housing 720. The housing 720 is mounted on the aligning apparatus (not shown) through the second and circular holes 740 and 745.

The fixing nail 750 includes a rod-shaped connection part 770 inserted into the first circular hole, a handle 760 connected to one end of the connection part 770, a wedge 780 connected to the other end of the connection part 770 and inserted between the supporter 450 of the holder 410, which is fitted into the auxiliary groove 735, and an inner wall forming the main groove 730. In order to allow the fixing nail 750 to be easily inserted into the housing 720, the connection part 770 is detachable from the wedge 780. That is, a male screw is formed at the other end of the connection part 770 and a cylindrical hole (not shown) formed at an inner wall thereof with a spiral furrow provided at the side of the wedge 780 corresponding to the other end of the connection part 770.

Now, the process for mounting the holder 410 on the holder base 710 will be described hereinafter.

First, the handle 760 of the holder base 710 is pulled away, in such a manner that the wedge 780 at the first circular hole of the housing 720. Then, the supporter 450 of the holder 410 is inserted into the auxiliary groove 735 of the housing 720.

Thereafter, the wedge 780 is press-fitted between the supporter 450 of the holder 410 and the inner wall forming the main groove 730 by pushing the handle 760 of the holder base 710, thereby fixing the holder 410 to the holder base 710.

Figure 9:
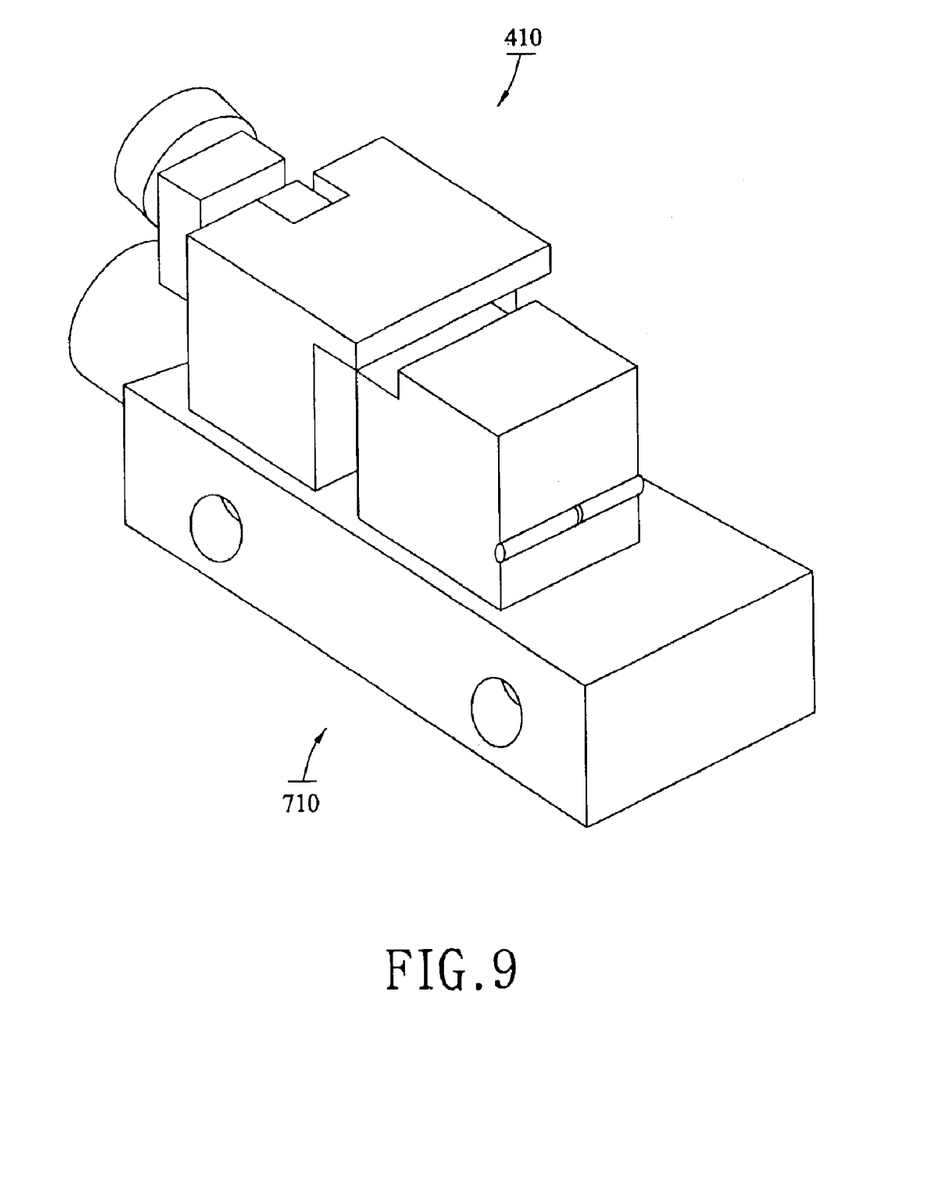
FIG. 9 is a perspective view, in which a holder shown in FIG. 4 is mounted on a holder base shown in FIG. 9; and, FIG. 10 is a perspective view showing a method for aligning an optical fiber block by using a holder shown in FIG. 4.

FIG. 9 is a perspective view, in which the holder shown in FIG. 4 is mounted on the holder base shown in FIG. 9. As shown, the holder 410 is mounted on an upper surface of the holder base 710.

Figure 10:
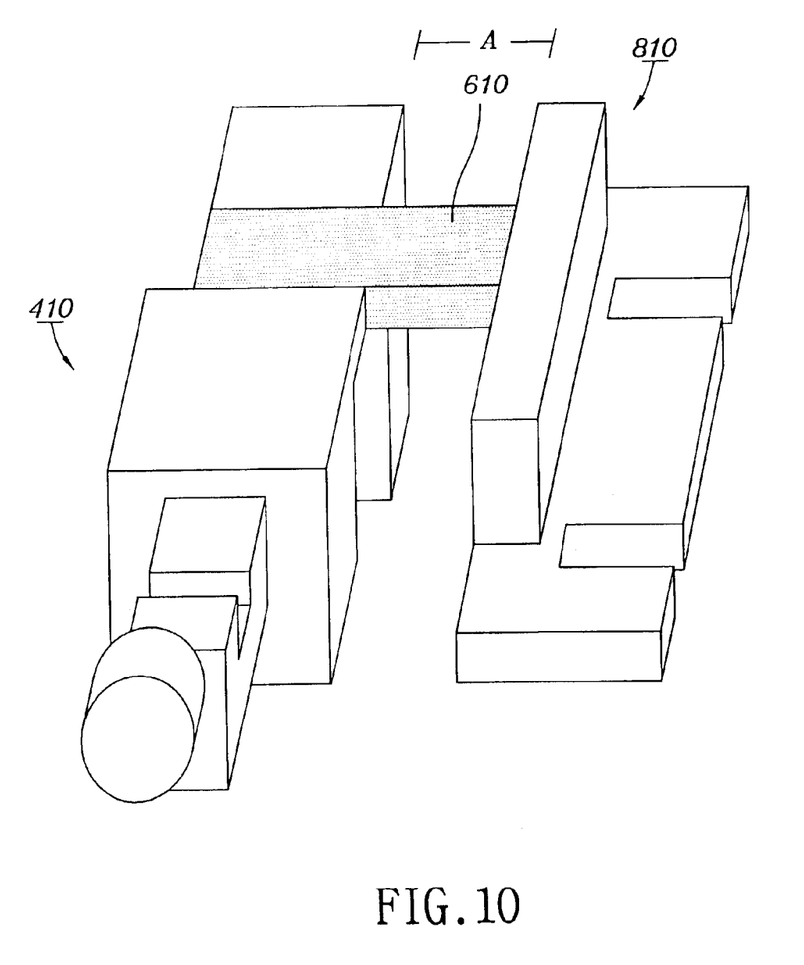

FIG. 10 is a perspective view showing a method for aligning the optical fiber block using the holder shown in FIG. 4. As shown, a stopper 810 for aligning the optical fiber block 610 is disposed adjacent to the holder 410.

The holder 410 is mounted on the holder base 710 shown in FIG. 7, and the holder base 710 is mounted on the aligning apparatus (not shown). Note that the aligning apparatus includes a plurality of motors for precisely aligning the holder base 710.

The stopper 810 is used to arrange one end of the optical fiber block 610 to a reference position. The stopper 810 is installed on an optical table having a plurality of holes arranged in a mesh pattern using a bolt. When the stopper 810 is fixed, the holder 410 can be moved. That is, in a state that the stopper 810 is spaced from the optical fiber block 610, the holder 410 can vertically moved to a predetermined vertical position and horizontally moved. The horizontal movement is stopped when the optical fiber block 610 makes contact with the stopper 810. As such, the distance between one end of the optical fiber block 610 and the side of the holder 410 can be constantly maintained using the stopper 810. That is, the holder 410 is movable while the stopper 810 is fixed.

In operation, the distance between one end of the optical fiber block 610 and one side of the holder 410 is greater than a predetermined distance A during the initial stage. After moving the holder 410 vertically to a predetermined vertical position or a desired location while the optical block 610 is spaced away from the stopper 810, the holder 410 is then moved horizontally to a predetermined horizontal position, during which the optical fiber block 610 serves to counter act the horizontal movement of the holder 410 using the stopper 810, thereby aligning the optical fiber block 610 at a stationary position.

As described above, the holder and the holder base according to the present invention can detachably mount the object by simply moving the wedge in forward and backward directions. In addition, the fixed object is prevented from being disturbed as the wedge with the spring helps to hold the object in place. Furthermore, the holder and the holder base according to the present invention can arrange one end of the object to a desired reference position using the stopper and constantly maintain the distance between one end of the object and the side of the holder, so that an automatic alignment of the object can be performed.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A holder for fixing an object in a stationary position during an alignment process, comprising:
   a body having a protruding jaw formed at an upper portion thereof, and a protrusion part having a hole at a front portion thereof and extending from the protruding jaw by a predetermined length;
   a sliding member having an opening slidably coupled to the protrusion part of the body;
   a spring having a first end fixably attached to the body and a second end fixably attached to the sliding member for applying an elastic restoring force to the sliding member in a direction towards the body;
   a fixing nail having a handle at one end thereof and being inserted inside the hole of the protrusion part through a rotation of the handle; and,
   a wedge coupled to the fixing nail and slidably inserted between the protrusion part and an inner wall forming the opening of the sliding member.

2. The holder as claimed in claim 1, further comprising a groove is formed in a lower inner surface of the opening of the sliding member.

3. The holder as claimed in claim 2, wherein the groove is a rectangular groove.

4. The holder as claimed in claim 2, further comprising a first hanger installed on the groove of the sliding member for fixing the first end of the spring.

5. The holder as claimed in claim 1, wherein the body comprises an elongated hole for receiving the spring.

6. The holder as claimed in claim 5, further comprising a second hanger is provided to fix the second end of the spring, which passes through the hole of the body.

7. The holder as claimed in claim 1, further comprising a supporter positioned at a lower surface of the body.

8. The holder as claimed in claim 1, wherein the hole of the protrusion part defines a cylindrical wall having a spiral furrow.

9. The holder as claimed in claim 1, wherein the upper inner surface of the protrusion part slidably locks with the upper surface of the protrusion part.

10. The holder as claimed in claim 1, wherein the wedge comprises a rectangular grove formed at a lower surface thereof, so that the wedge can move in a direction vertical to a sliding direction of the sliding member.

11. The holder as claimed in claim 1, wherein a rotation of the fixing nail causes the sliding member to lock the object against one end of the protruding jaw of the body.

12. The holder as claimed in claim 1, further comprising a holder base for mounting the holder.

13. The holder as claimed in claim 1, wherein the object is received in an upper surface of the protrusion part of the body.

14. A holder base for mounting a holder used to fix an object during an alignment process, comprising:

a housing having a hole, a main groove on an upper surface thereof, and an auxiliary groove extending from one end of the main groove for receiving the holder;

a fixing nail having a handle at one end and a connection part at the other end, the fixing nail being inserted into the hole of the housing; and, a wedge detachably coupled to one end of the connection part.

15. The holder base as claimed in claim 14, wherein the edges of the auxiliary groove are chamfered into a C-shape.

16. The holder base as claimed in claim 14, wherein the housing further comprising a plurality of holes for receiving an alignment means.

17. The holder base as claimed in claim 14, wherein the holder is locked in the main groove as the wedge detachably coupled to the connection part is being pushed against the holder.

* * * * *